(Model.)

J. W. TALLMADGE.
EXUDATION CAP.

No. 591,434. Patented Oct. 12, 1897.

Witnesses:
A. B. Upham.
Jeannette Soule.

Inventor,
James Kenants Tallmadge

UNITED STATES PATENT OFFICE.

JAMES WINANTS TALLMADGE, OF BOSTON, MASSACHUSETTS.

EXUDATION-CAP.

SPECIFICATION forming part of Letters Patent No. 591,434, dated October 12, 1897.

Application filed August 2, 1897. Serial No. 646,849. (Model.)

*To all whom it may concern:*

Be it known that I, JAMES WINANTS TALLMADGE, a citizen of the United States, residing at Boston, in the county of Suffolk and Commonwealth of Massachusetts, have invented a new and useful Exudation-Cap, of which the following is a specification.

My invention relates to improvements in mechanism for dampening surfaces, it being especially adapted for moistening in the process of affixing stamps to and closing envelops. I accomplish this object by means of the device illustrated in the accompanying drawings, in which—

Figure 3:
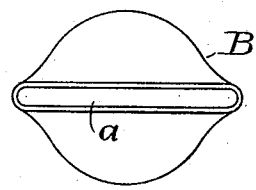
Figure 4:
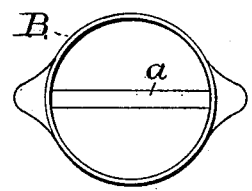
Figure 1:
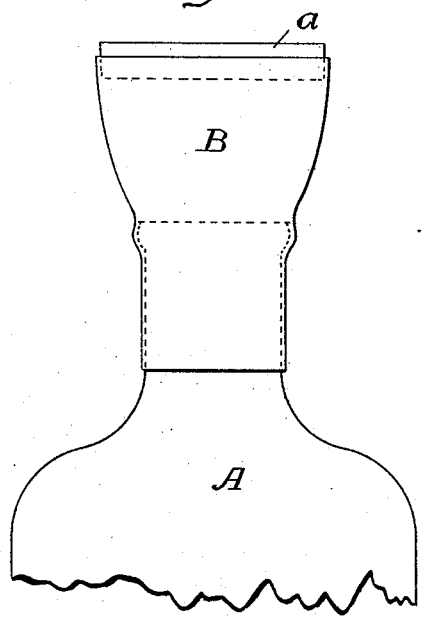
Figure 2:
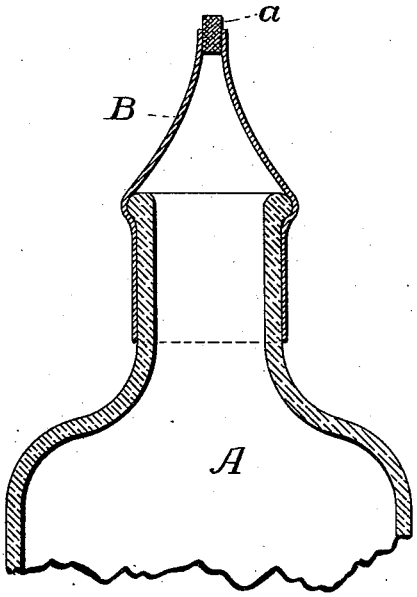

Figure 1 is a front elevation. Fig. 2 is a side elevated section. Fig. 3 is a top plan, and Fig. 4 is a bottom plan.

Similar letters refer to similar parts throughout the several views.

A represents the outlet portion of a receptacle of any desired size, shape, or material.

B represents a flexible cap, preferably of rubber, closed at its top by an affixed porous nozzle $a$, preferably of felt, and its lower portion tightly adjusted to the diametrical exterior of outlet A.

Said device being adjusted, as above described, to any receptacle containing the requisite fluid forms a combination which makes an unique automatic dampener. The dampener is used by applying (like a brush) said porous nozzle $a$ to the surface that requires moistening, the extrusion being controlled by operator using more or less pressure. All expansion and contraction of porous nozzle $a$ is accommodated by its unification with and the flexibility of cap B.

I am aware that caps holding porous material have before been used for the purposes above proposed, but in all previous inventions, so far as I am aware, said porous materials, when employed as discharge-nozzles, have been held or confined between stiff and stationary lips or flanges, and for this reason the extrusion has been unreliable, made so by expansion and contraction of the porous substance tightening or loosening in its rigid holder, swelling when damp (which closes its pores) and shrinking when dry (which opens its pores.) I am also aware that flexible caps (some containing sponge inward) have before been used for the purposes above proposed, but in all previous similar inventions, so far as I am aware, said sponge has been placed wholly inside of the caps and employed only as a filler and check, (but with or without sponge inward.) Said caps discharge through minute perforations, slits, or slots that soon loose their valvular action and usefulness by the warping or buckling and hardening of the cap.

In my invention porous and flexible materials are united so as to become one and perform their respective services without detriment to their normal condition. The flexible impenetrable cap portion of the unification acts as a hydraulic flexor and the porous nozzle portion (which is not susceptible of hardening) acts as a combined stopper, conductor, and spreader. With this combination any slight change in flexibility of the cap makes no perceptible difference in the porosity of the nozzle.

I claim—

As a new article of manufacture, an exudation-cap adapted to be placed upon receptacles, consisting of a flexible open-ended portion, said portion having incorporated in the outer open end and essentially unified therewith, a porous nozzle, substantially as described.

JAMES WINANTS TALLMADGE.

Witnesses:
A. B. UPHAM,
L. A. TALLMADGE.